US007394051B2

(12) United States Patent
Hetherington

(10) Patent No.: US 7,394,051 B2
(45) Date of Patent: Jul. 1, 2008

(54) IMAGE-BASED TRACKING SYSTEM FOR MODEL TRAIN CONTROL

(75) Inventor: Michael Hetherington, Williamston, MI (US)

(73) Assignee: P.I. Engineering, Inc., Williamston, MI (US)

( * ) Notice: Subject to any disclaimer, the term of this patent is extended or adjusted under 35 U.S.C. 154(b) by 112 days.

(21) Appl. No.: 11/320,071

(22) Filed: Dec. 28, 2005

(65) Prior Publication Data

US 2006/0255246 A1 Nov. 16, 2006

Related U.S. Application Data

(60) Provisional application No. 60/640,805, filed on Dec. 28, 2004.

(51) Int. Cl.
*G01J 1/20* (2006.01)

(52) U.S. Cl. .................................... 250/203.3; 382/103

(58) Field of Classification Search .............. 250/203.1, 250/203.2, 203.3; 382/103–104
See application file for complete search history.

(56) References Cited

U.S. PATENT DOCUMENTS

| | | | | |
|---|---|---|---|---|
| 5,448,142 | A * | 9/1995 | Severson et al. | 318/280 |
| 5,803,411 | A * | 9/1998 | Ackerman et al. | 246/169 R |
| 2001/0045978 | A1* | 11/2001 | McConnell et al. | 348/42 |
| 2002/0137427 | A1* | 9/2002 | Peters et al. | 446/454 |
| 2005/0022688 | A1* | 2/2005 | Asada | 105/26.05 |

* cited by examiner

*Primary Examiner*—Georgia Y. Epps
*Assistant Examiner*—Kevin Wyatt
(74) *Attorney, Agent, or Firm*—Gifford, Krass, Sprinkle, Anderson & Citkowski, PC

(57) ABSTRACT

A cost-effective and accurate model train position transponding arrangement deploys inexpensive CCD cameras to "watch" the layout and determine the locations of trains and landmarks. Each item of interest features an optical beacon, preferably an infrared LED, which can be "seen" by the cameras. Filtering out other light and using color cameras these bright spots can easily be tracked by software. These beacons can be stationary, embedded in the track or mobile, mounted on the trains. Certain LEDs can be controlled to simply flash at a certain frequency if more accuracy is needed to determine the source of the bright spot. The cameras are preferably mounted more or less overhead, but any angle with sufficient visibility of the layout will work because the image will be calibrated to the actual layout. In cases where the LED beacon is blocked from the camera's vision the software may interpolate the position of the beacon based on the last known position and velocity. With 2 or more beacons on a single train, the software can make inferences about the other beacons based on the known physical separation between the beacons on the train.

10 Claims, 3 Drawing Sheets

22 Cameras
24 Computer and Software
26 Train Control System
Trains with Beacon LEDs 28
Stationary Beacon LEDs 30

IMAGE-BASED TRACKING SYSTEM FOR MODEL TRAIN CONTROL

REFERENCE TO RELATED APPLICATION

This application claims priority from U.S. Provisional Patent Application Ser. No. 60/640,805, filed Dec. 28, 2004, the entire content of which is incorporated herein by reference.

FIELD OF THE INVENTION

This invention relates generally to model train control and, in particular, to the use of optical beacons for such purpose.

BACKGROUND OF THE INVENTION

Model trains can be controlled by various electronic means. The most popular system is called DCC (Digital Command and Control) and is a standard set by NMRA (National Model Railroad Association). There are also various RF and other protocols.

Existing controls are primarily one-way communication systems. Commands are sent to a decoder in the locomotive or rolling stock. Each decoder has an address, and specific commands can be sent to that decoder. Generally, a human operator is watching the layout and controlling the various trains on the layout. However, it is difficult to determine the physical location of the train on the layout by any electronic means. This makes computer control of model railroad signals and routing of switches and other trains very difficult.

SUMMARY OF THE INVENTION

This invention overcomes the difficulties of model train position transponding in a cost-effective and highly accurate way. The position data can be used for servo control of the actual speed of the model locomotives and also for a variety of other computer controlled functions such as display of position on a CTC (Central Train Control) display, control of signals, switches and sound control systems.

Using inexpensive CCD cameras to "watch" the layout, a system can be designed to determine the locations of each of the trains. Each item of interest will have an optical beacon, preferably an infrared LED, which can be "seen" by the cameras. Filtering out other light and using color cameras these bright spots can easily be tracked by software. These beacons can be stationary, embedded in the track or mobile, mounted on the trains.

The ability to control these LED beacons allows the software to identify each different LED by flashing the LED at a known time and seeing which bright spot flashes. Additionally, certain LEDs can be controlled to simply flash at a certain frequency if more accuracy is needed to determine the source of the bright spot.

The cameras are preferably mounted more or less overhead, but any angle with sufficient visibility of the layout will work because the image will be calibrated to the actual layout. In cases where the LED beacon is blocked from the camera's vision the software may interpolate the position of the beacon based on the last known position and velocity. Additionally, with 2 or more beacons on a single train, the software can make inferences about the other beacons based on the known physical separation between the beacons on the train.

DETAILED DESCRIPTION OF THE INVENTION

Figure 1:
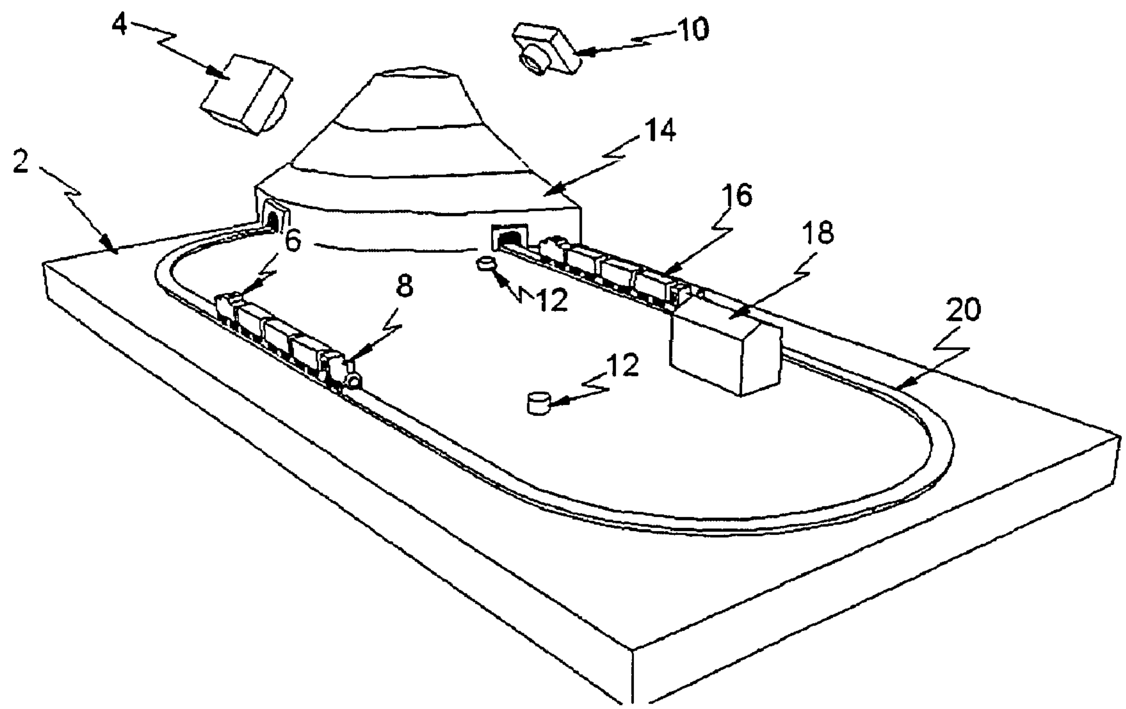
FIG. 1 is a perspective view of a model train layout.

Referring now to the drawings, FIG. 1 is a perspective view of a model train layout. Cameras 4, 10 mounted above the layout 2 are used to take digital images of the entire layout. LEDs or other light sources, mounted on the locomotive 8 and rolling stock 6 in inconspicuous but visible places 38, 40 appear in these images. The LEDs can be infrared so they do not appear visible to the human eye. In some cases the light sources might be use visible light, such as the head light of a locomotive 48. Filters and the use of color cameras will allow the light sources or beacons to be discerned from other parts of the image. Additionally, stationary beacons 50, 54 can be mounted in the track 52 to monitor track sections and to locate trains that are not equipped with moving beacons. Real-time software will receive these images and process the information to determine the location and velocity of each moving beacon and determine other positions and velocities from the stationary beacons. The software can apply digital filters and other image processing algorithms to further discern the position of the beacons in the image.

Figure 2:
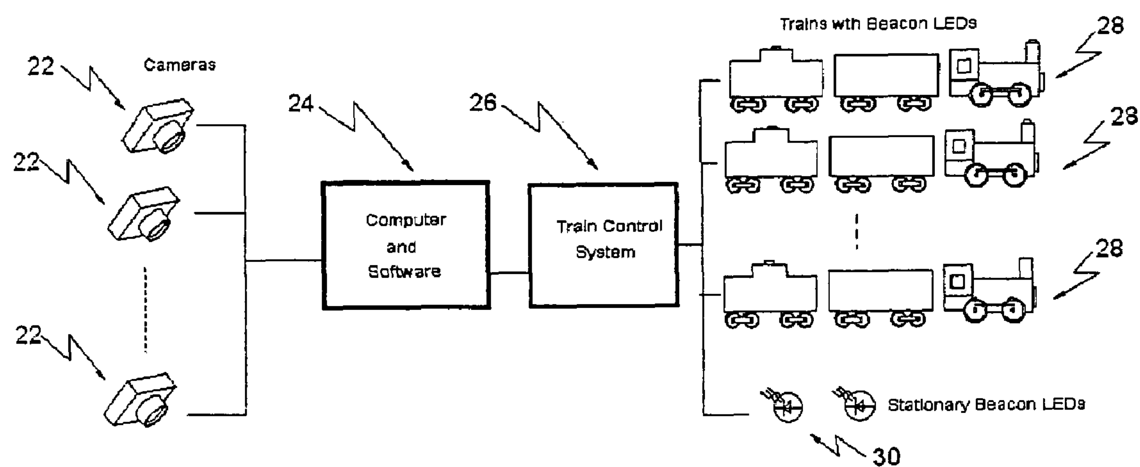
FIG. 2 is a block diagram of a system according to the invention.
Figure 3:
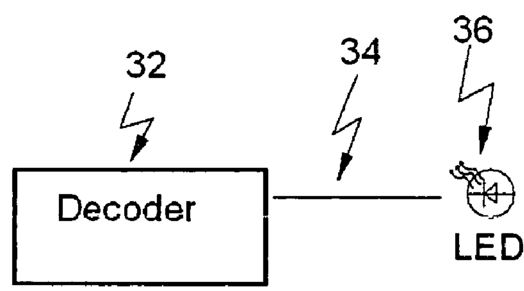
FIG. 3 is a diagram that shows how accessory control wires on standard addressable decoders allow a beacon to be software-controlled.

FIG. 2 is a block diagram of a system according to the invention. Images from one or more cameras 22 are fed to a computer 24 where real time software analyzes the images. The software must determine which beacon is visible in a portion of the image. Flashing the beacon can do this. The beacons can be flashed at a fixed frequency. If this frequency is known then the software can correlate it to a certain beacon. Alternatively, a command from the computer controlled train control system 26 to each train with a decoder and LED beacon 28 can be used to flash the beacon 36. Using the accessory control wires 34 on standard addressable decoders 32 the beacon 36 can be controlled by the software (FIG. 3). By flashing the beacon 36 at a specific time and analyzing the images returned from the cameras 22 the software can determine which spot on the image is correlated to a certain decoder and therefore a certain locomotive 8 or rolling stock 6.

Figure 4:
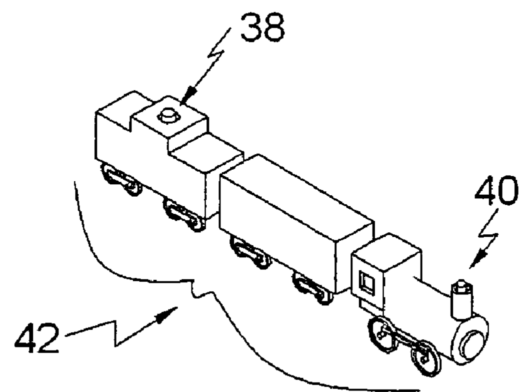
FIG. 4 is a perspective drawing of a model train having a plurality of moving beacons.

One or more cameras 4, 10 are mounted more or less overhead but any angle with sufficient visibility of the layout 2 will work because the images will be calibrated to the actual layout 2 and track path 20. A calibration process can be used to correlate the path that a moving beacon follows in the image and the actual track geometry 20 known to the software. This calibration will compensate for any a skewed or distorted image that will result from the camera lens and by mounting the camera at an angle. In cases where the beacon is blocked from the camera's 4 vision, such as a model building 18, the software will interpolate the position of the beacon based on the last known position and velocity. Additionally, with 2 or more moving beacons 38, 40 on a single train 42 the software can make inferences about the other beacons based on the known physical separation between the beacons on the train (FIG. 4). So as one end of a train 16 is obscured by an object 18 or enters a tunnel 14 the software can predict where the other end is and identify it when it appears in the field of view again.

In situations where a single camera 4 cannot view the entire layout or a large portion is obscured like underneath a model mountain 14 additional cameras 10 can be used to provide images of these locations. The images from the two or more cameras 22 are correlated to the known track geometry during the calibration process. To further aid in the calibration process and to avoid any errors from bumping or slightly moving the cameras after installation, one or more stationary beacons 12 may be used. These stationary LED beacons 12 will provide know reference points for ease of installation and maintenance of the system. The stationary beacons 30 may or may not be controlled by the software.

Figure 5:
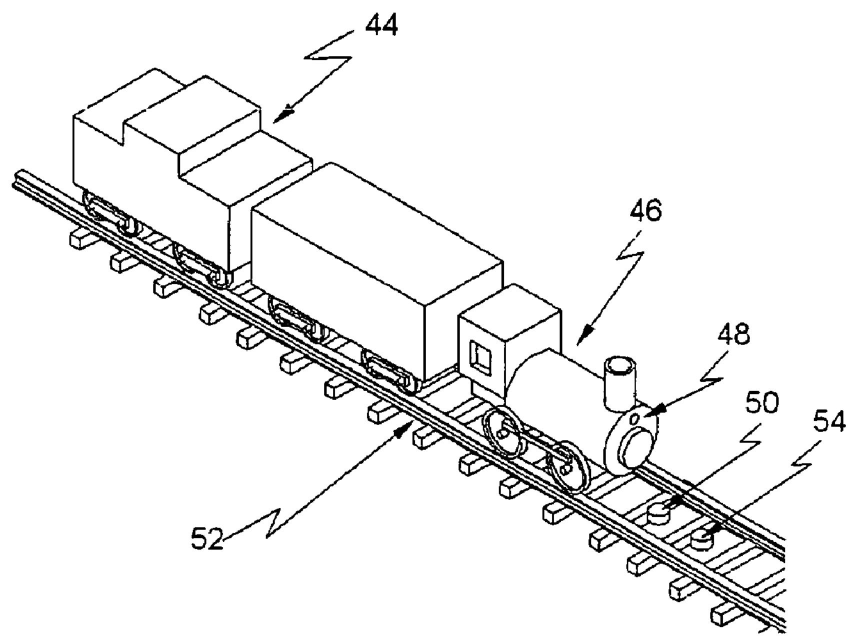
FIG. 5 is a perspective drawing of a model train on a track showing how stationary beacons can be used to monitor track sections and locate trains that are not equipped with moving beacons.

Stationary beacons 50, 54 can also be located in the track 52, as shown in FIG. 5. These beacons can be used to detect if a train is in a certain "block." The train 44, 46 passing over the beacons 50, 54 in the track 52 will obscure the beacon from the camera. Even if the rolling stock or locomotive is not equipped with a beacon the control system can know if there is a train in that block. The speed and direction of that train can be determined because 2 beacons 50, 54 are placed a short distance apart. The time between when the first beacon 52 is covered and the second 54 is used to calculate the speed. Also the length of a train can be determined by the speed and the total time the beacons are covered. The software will compensate for the light appearing between cars for a short moment when the coupling travels over the beacons.

A 1-megapixel camera, viewing a 3×3 meter area has a resolution of about 3 mm. With this resolution it is easy to integrate the position and determine the velocity of each moving beacon. The fixed path nature of trains and their relatively high moment of inertia allows the software to accurately predict the location of the beacon even if it is out of view for a short period of time. It also means that the image data can be up dated fairly infrequently, on a computer time scale. This will allow the use of inexpensive commercially available cameras such as ones used for video conferencing. Additionally, the velocity information can be used to help control the train's speed and the control system is now a closed-loop system. Speed commands can be sent by the train control system 26 to the locomotives 28 and the actual velocity read from the images 22, the speed commands can be adjusted to servo control the locomotives and achieve accurate speeds.

Figure 6:
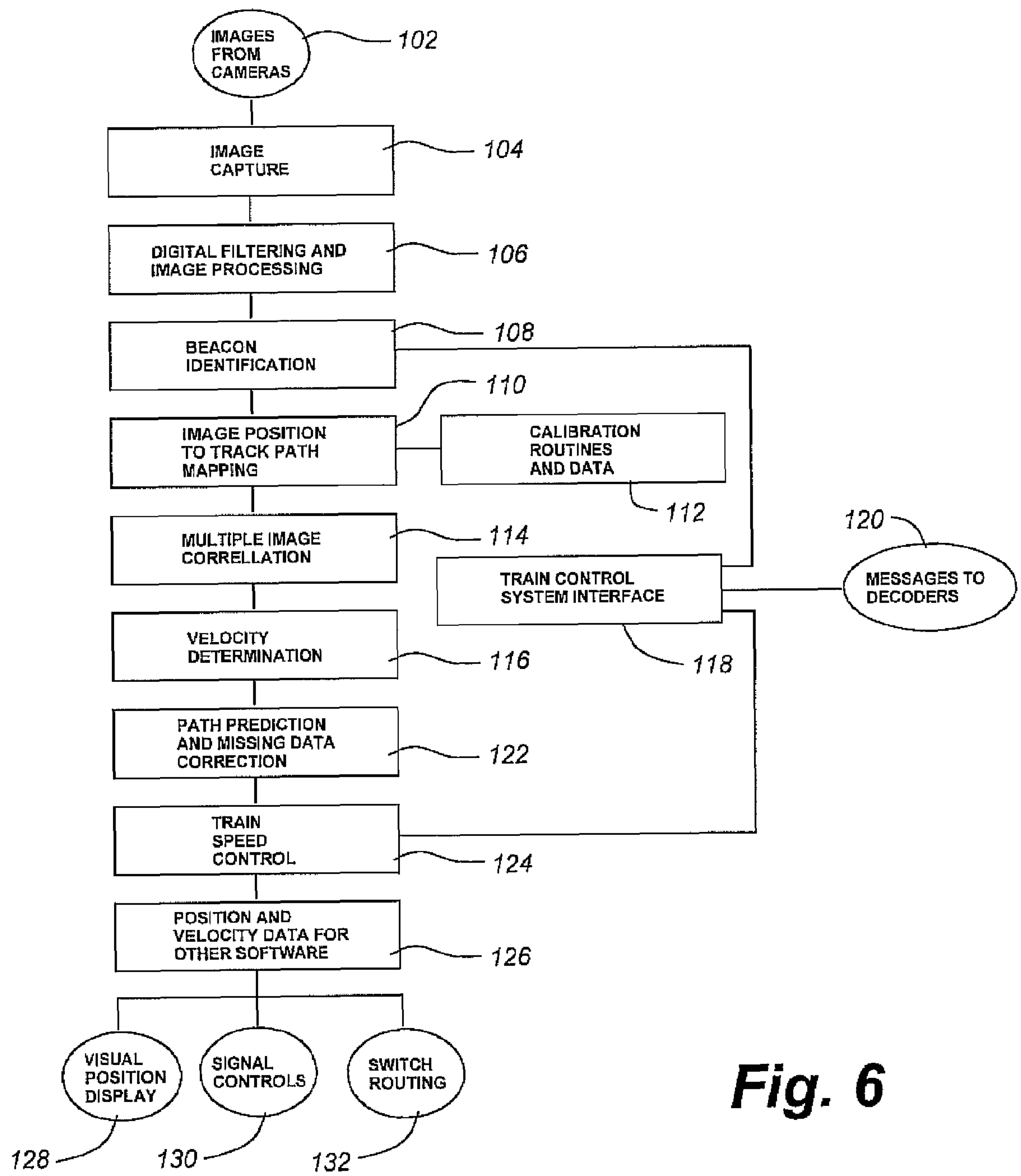
FIG. 6 is a flow diagram illustrating the interaction between hardware and software modules.

FIG. 6 is a flow diagram illustrating the interaction between hardware and software modules. Images from cameras are shown at 102, and these are captured at block 104 inside the software block diagram. Digital filtering and image processing takes place at 106, with beam identification being performed at block 108, for example, through flashing beacons generated by train control system interface 118. Image position to track path mapping occurs at 110 based upon calibration routines and related data 112. At block 114 multiple image correlation is computed, with velocity being determined at block 116. As necessary, path prediction and missing data correction is carried out at block 122, with speed control occurring at block 124 through inputs received from system interface 118. Position and velocity data for other software is shown at 126, with connections to visual position display 128, signal controls 130 and switch routing 132. Messages to decoders at 120 are derived through train control system interface 118.

I claim:

1. An image-based tracking system for model train control, comprising:

an optical beacon mounted on a model train positioned on a track in a train layout;

a train controller for issuing a command to the train through the track;

a decoder in the train for receiving the command and operating the optical beacon in response thereto;

one or more cameras to image the beacon; and a processor in communication with each camera for determining the location of the train as a function of beacon position.

2. The system of claim 1, including an infrared beacon.

3. The system of claim 1, including:

a plurality of beacons; and wherein particular beacons are identified through flashing.

4. The system of claim 1, wherein the cameras are mounted generally above the layout.

5. The system of claim 1, wherein the processor is operative to interpolate the position of a beacon if it temporarily out of view.

6. The system of claim 1, including one or more stationary beacons.

7. The system of claim 1, further including a beacon on the front and the end of the train.

8. The system of claim 1, including:

a plurality of beacons; and wherein particular beacons are identified through color.

9. The system of claim 1, including:

beacons that flash at predetermined intervals; and wherein the processor is operative to determine the speed of the train as a function of the flashing.

10. The system of claim 1, including:

a plurality of trains, each with a decoder and a beacon; and wherein each decoder is addressable so that the beacon for a particular train is activated only when that train is addressed.

* * * * *